United States Patent [19]
Swiatlowski

[11] 3,935,677
[45] Feb. 3, 1976

[54] METALLOGRAPHIC POLISHER WITH SPEED CONTROL

[75] Inventor: Gerald G. Swiatlowski, Baroda, Mich.

[73] Assignee: Leco Corporation, St. Joseph, Mich.

[22] Filed: June 27, 1974

[21] Appl. No.: 483,791

[52] U.S. Cl............................................. 51/134.5 R
[51] Int. Cl.² ......................................... B24B 55/00
[58] Field of Search........ 51/134.5 R; 318/301, 309, 318/311, 312, 326, 327

[56] References Cited
UNITED STATES PATENTS

| | | | |
|---|---|---|---|
| 3,441,826 | 4/1969 | Mason | 318/327 |
| 3,704,556 | 12/1972 | Nedreski | 51/134.5 R |
| 3,835,357 | 9/1974 | Holzer | 318/327 |

Primary Examiner—Harold D. Whitehead
Attorney, Agent, or Firm—Price, Heneveld, Huizenga & Cooper

[57] ABSTRACT

A metallographic polisher includes a control circuit for providing a selectable constant speed for the polisher under varying load conditions. A tachometer provides electrical signals representative of the speed of rotation of a polishing wheel, which signals are compared with signals representing a selected speed to provide drive signals to the polisher motor and speed indicating means. A limit circuit is provided to limit the motor speed such that it will not exceed a predetermined limit above the preselected speed thereby protecting the specimen being polished in the event of a power or component failure.

9 Claims, 3 Drawing Figures

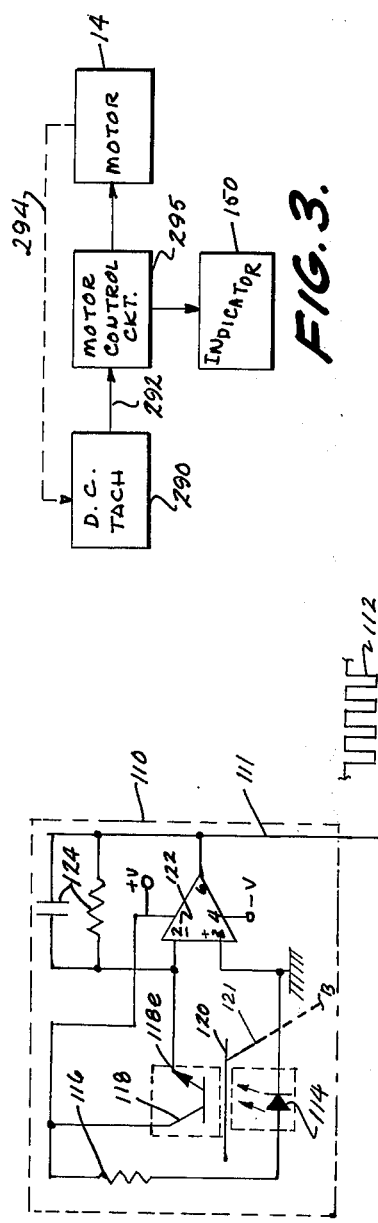
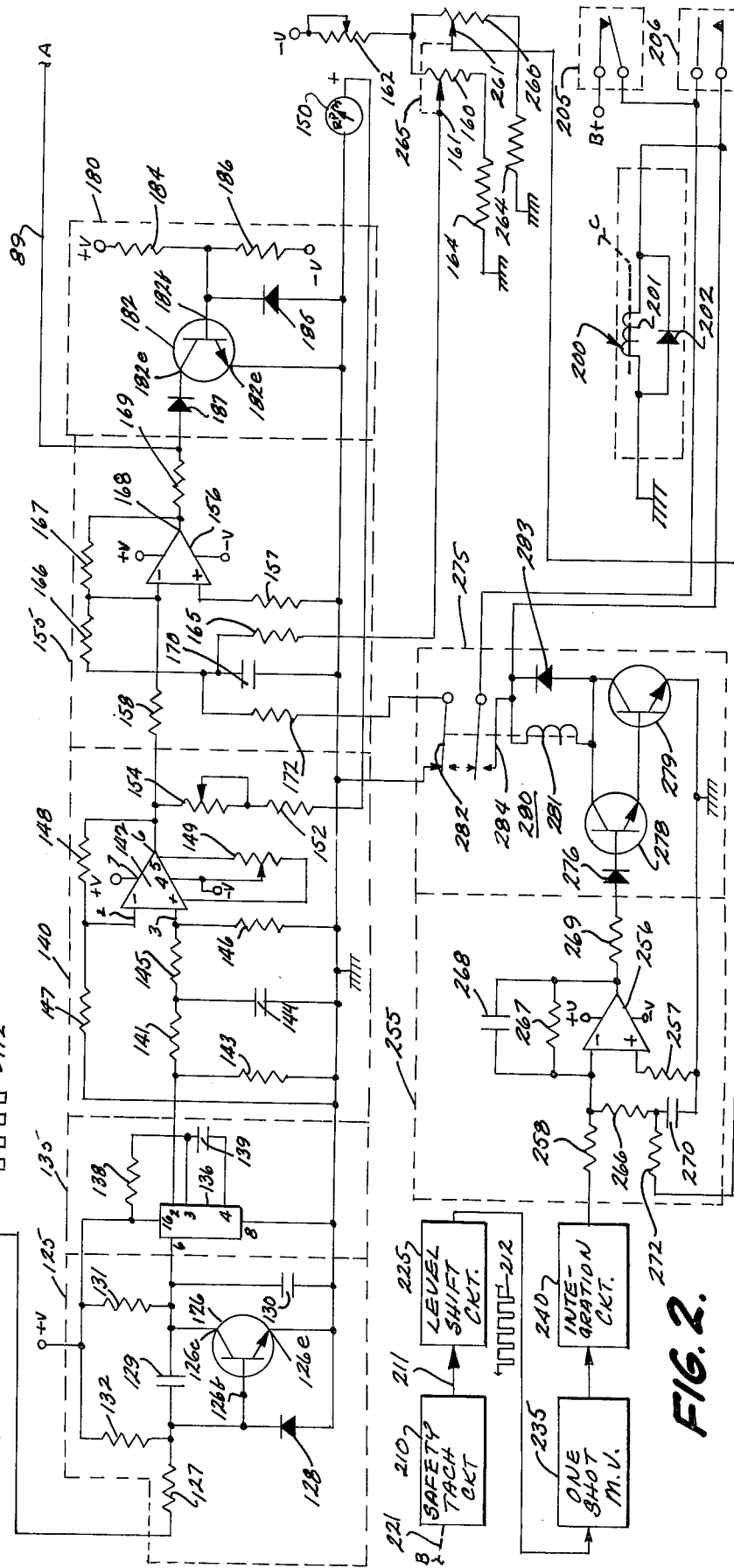
FIG. 2.
FIG. 3.

METALLOGRAPHIC POLISHER WITH SPEED CONTROL

BACKGROUND OF THE INVENTION

This invention relates to control circuits for electrically driven metallographic polishing apparatus.

In polishing apparatus of the type in which a circular disc is employed with a relatively fine grit abrasive for polishing metallographic specimens for microscopic examination, great care must be taken to prevent damage to the specimens being polished since they frequently are of considerable value andd irreplaceable. Should, for example, the polishing speed increase significantly beyond the selected speed, the specimen being polished can be seriously damaged or even destroyed. With many prior art polishers, the speed is manually selected and can vary significantly with mechanical load and line voltage variations. Although closed loop feedback speed control systems are generally known, the use of a simple feedback system could, should a component of the control systems fail, cause the motor to uncontrollably increase its speed thereby damaging or destroying the specimen. Although speed control to provide a constant polishing speed under varying loads is desirable, heretofore, conventional control systems have not successfully reduced the possibility of sample damage or destruction.

SUMMARY OF THE INVENTION

The present invention, however, employs a system whereby a first circuit provides a feedback loop for speed control and a second independent circuit provides a safety speed limit control which tracks the preselected speed and will automatically inactivate the polisher should the polisher speed exceed the selected speed by a predetermined amount. Additionally, in one embodiment, separate tachometer pick-ups are employed for each of the circuits for further protecting the system from potential failure.

Other novel aspects of the system include the provision of a delay means in the speed limit circuit to prevent unintentional operation for temporary speed changes of insignificant duration. Also, in the event the power supply fails, the control circuit includes means for automatically deactivating the motor.

According to other novel aspects of this invention, noise immune motor control circuitry is employed and indicating means are provided to display the speed of operation of the polisher.

It is an object of the present invention, therefore, to provide an improved speed control system for metallographic specimen polisher.

Another object of the present invention is to provide a control system for a metallographic polisher which provides a selectable speed control for normal conditions and includes a safety speed limit circuit which tracks the selected speed and deactuates the polisher if the selected speed is exceeded for any significant length of time.

A further object of the present invention is to provide a speed control circuit including means for displaying the actual operating speed of a metallographic polisher.

Another object of this invention is to provide a motor speed control system with noise immune line synchronization.

These and other objects of the present invention and the novel features thereof can be best understood by referring to the following specification together with the accompanying drawings in which:

BRIEF DESCRIPTION OF THE DRAWINGS

FIG. 2 is an electrical circuit diagram partly in block and schematic form of the remainder of the control circuit for the metallographic polisher; and FIG. 3 is an electrical circuit diagram in block form of an alternative embodiment of the present invention.

DETAILED DESCRIPTION OF THE PREFERRED EMBODIMENT

Figure 1:
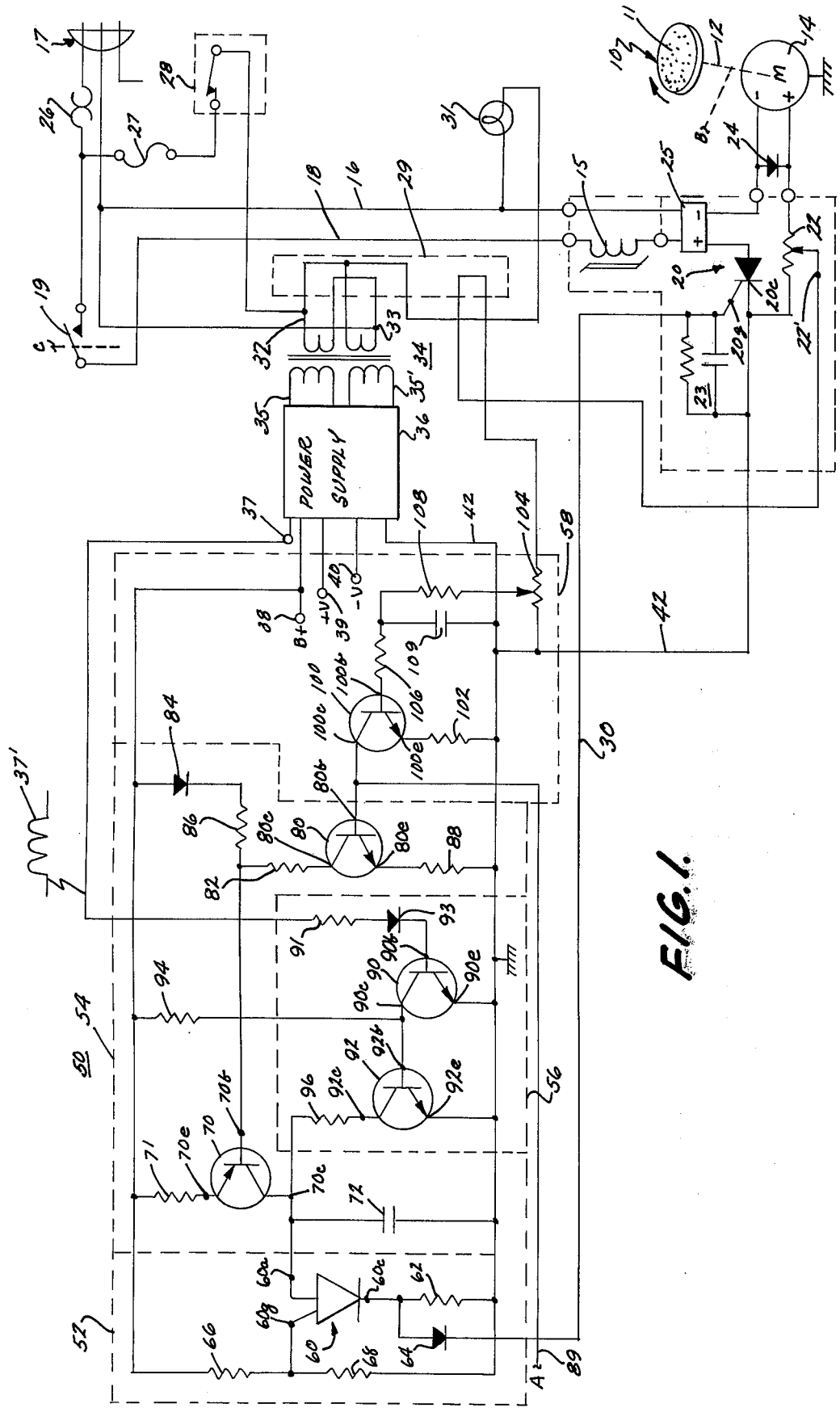
FIG. 1 is an electrical circuit diagram in schematic and block diagram form of a portion of the control circuit for the polisher and shows the polishing element in schematic form.

Referring now to FIG. 1, the polishing machine includes a disc-shaped rotatable platen 10 mechanically coupled to a three-quarter horsepower permanent magnet drive motor 14 by coupling 12 shown schematically as a dotted line in the figure. Coupling 12 may conventionally include a gear box for speed reduction of disc 10 and the drive shaft of motor 14. These conventional elements are shown schematically in FIG. 1, it being understood that the platen is suitably mounted by a conventional bearing support and has in one embodiment a diameter of 12 inches. Platen 10 includes an abrasive surface 11 which is used to polish metallographic specimens or samples positioned thereon. The abrasive element 11 may be in the form of a polishing compound applied to the disc or other conventional abrasive means such as discs. Although the preferred embodiment discloses a rotary polisher, the control system likewise can be employed with belt or other types of abrading apparatus.

The drive motor 14 receives pulsating direct current for its operation through a current path which includes a triggerable switch comprising SCR 20, which is coupled to the positive output terminal of a full wave bridge rectifier circuit 25. Circuit 25 is supplied with power from a first power line conductor 16 and a second conductor 18 which extend from a suitable power plug 17. Coupled in series with conductor 18 is a speed limit cut-off switch comprising relay contacts 19 associated with relay coil 201 shown in FIG. 2 as indicated by the dashed lines and interconnected reference characters C. Also in series with conductor 18 is a saturable core reactor 15 for regulating the current through SCR 20 and facilitating turn-off of the SCR as is conventionally known. A relatively low value (0.2 ohm) motor current sensing center tapped resistor 22 is coupled in series between SCR 20 and the motor 14 and a free wheeling diode 24 is coupled across the terminals of the motor.

The firing angle of SCR 20 and, therefore, its percentage on time is selectively controlled by signals on conductor 30 coupled to gate terminal 20g of the SCR, which control signals are developed as described in detail below to vary the speed of operation of motor 14 and, therefore, the directly related speed of rotation of platen 10. A resistive capacitive network 23 is coupled between the gate terminal and the system common and provides a normal protection against false triggering of the SCR.

Also coupled in the operating voltage supply is a circuit breaker 26 serially coupled with conductor 18 and a fuse 27 coupled from the junction of circuit breaker 26 and relay contacts 19 to one terminal 32 of the primary of a power transformer 34 through an on-off switch 28. The opposite terminal 33 of the primary winding of transformer 34 is coupled to conductor 16. Included in the primary supply is a voltage select plug 29, shown schematically in the figure and which can be positioned for 110 volt AC operation or 220 volt AC operation. In the embodiment shown, the plug is in the 110 volt position. A power on indicator light 31 is coupled between conductor 16 and switch 28 to indicate when power is applied to transformer 34.

Transformer 34 includes a pair of secondary windings 35 and 35' which are coupled to a conventional regulated power supply 36 providing at an output terminal 37 thereof, full wave rectified voltage indicated by waveform 37', a B+ voltage at output terminal 38 for supplying approximately +24 volts DC operating voltage for the transistor circuitry shown in FIG. 1, a +V supply at output terminal 39 for supplying approximately +15 volts to the circuitry shown in FIG. 2, and a −V supply at terminal 40 for supplying approximately −15 volts to the circuitry shown in FIG. 2. The circuits are interconnected to the commonly identified reference numerals to receive power from supply 36. Supply 36 is also coupled to a floating system common comprising conductor 42.

The motor control circuit 50, shown in FIG. 1, includes a SCR trigger circuit 52, a controllable constant current source 54, a line synchronization circuit 56, and a motor over current protection circuit 58. The SCR trigger circuit 52 includes a programmable unijunction transistor (PUT) 60 having an anode terminal 60a coupled to one terminal of charge storage means comprising a capacitor 72, the remaining terminal of which is coupled to system common 42. The cathode 60c of the PUT is coupled to system common through resistor 62. A steering diode 64 is coupled to the junction of resistor 62 to terminal 60c to apply the positive 20 control signals to conductor 30 coupled to the gate 20g of SCR 20.

The PUT is programmed to fire at a predetermined voltage developed across the capacitor 72 by means of bias resistors 66 and 68 serially coupled from the B+ supply to chassis ground. The junction of resistors 66 and 68 are coupled to gate terminal 60c of the PUT such that the normally nonconductive transistor will be rendered conductive when the voltage across the capacitor reaches or exceeds the voltage of the junction at the gate 60g of the transistor.

Current source 54 determines the charging rate on capacitor 72 and, therefore, the firing of the PUT includes a transistor 70. Transistor 70 has a collector terminal 70c coupled to the junction of PUT 60a and capacitor 72 and an emitter terminal 70e coupled to the B+ supply through current limiting resistor 71. The base terminal 70b of the PNP transistor 70 is coupled to the collector terminal 80c of a linear amplifier transistor 80 by means of resistor 82. Base terminal 70b and collector terminal 80c are also coupled to the B+ supply through the series combination of diode 84 and resistor 86. The emitter terminal 80e of NPN transistor 80 is returned to chassis ground through resistor 88.

Control signals are applied to the linear amplifier at base terminal 80b of transistor 80 by means of conductor 89 which receives signals for the speed and safety control circuitry shown in FIG. 2 by interconnecting terminal points A. Thus, it is seen that the linear amplifier controls the capacitor charging current supplied by the current source. The unbypassed emitter resistor 71 tends to maintain the controlled current from transistor 70 constant at the amplitude provided by the drive signals from the linear amplifier.

Noise immune synchronization of the SCR is achieved in part by the synchronization circuit 56 comprising a two-stage amplifier comprising NPN transistors 90 and 92 with their emitter terminals 90e and 92e, respectively, coupled to the system common. The base terminal 90b of the input transistor is coupled to the full wave output terminal 37 of power supply 36 by means of a resistor 91 and current steering diode 93. The collector terminal 90c is coupled to the B+ supply through resistor 94. The base terminal 92b of transistor 92 is coupled to the collector terminal 90c of transistor 90 and collector terminal 92c is coupled to the junction of capacitor 72 with transistor 70 by means of current limiting resistor 96. This circuit, therefore, regulates the firing of PUT 60 and SCR 20 to occur in phase with the pulsating line current applied to motor 14 through circuit 25 by assuring capacitor 72 is discharged each half cycle of the 60 cycle applied line voltage. Since SCR is fired by direct voltage pulses developed across resistor 62, instead of AC pulses from the power line, circuits 52, 54 and 56 provide immunity to the SCR from noise signals on the power line which may otherwise false trigger the SCR.

The motor over current protection circuit 58 comprises an NPN control transistor 100 having a collector terminal 100c coupled to the base terminal 80b of transistor 80 and an emitter terminal 100e coupled to chassis ground through resistor 102. Base terminal 100b is coupled to the wiper arm 22' of current sensing potentiometer 22 by means of a factory adjust potentiometer 104 and the series combination of resistor 106 and 108. A bypass capacitor 109 is coupled from the junction of resistors 106 and 108 to chassis ground. In the event the current through motor 14 exceeds a predetermined amount, transistor 100 will conduct to clamp the base of transistor 80 near ground potential thereby rendering it nonconductive. This in turn cuts off the current source for capacitor 72 such that the PUT will not fire to turn SCR 20 on to supply drive current for the motor.

Before discussing a cycle of operation of the motor control circuit 50, a description of the structure comprising the speed control and speed limit control circuits shown in FIG. 2 will be presented. Electrical signals representative of the speed of the platen 10 are generated by an optical tachometer 110 of FIG. 2 which develops negative going signals illustrated by the waveform 112 adjacent output conductor 111 of the tachometer circuit. The tachometer includes a light emitting diode 114 coupled to the +V supply by means of a resistor 116 to direct light output therefrom to a phototransistor 118 through a conventional chopper disc 120. Disc 120 is mechanically coupled to the output shaft of the drive coupling 12 as schematically indicated by the dashed line connection 121 and interconnected terminals B in the figures. The resultant pulsed output from the emitter 118e of phototransistor 118 is applied to the negative input of an operational amplifier 122 which provides the negative speed representative output pulses 112 at conductor 111. Amplifier 122 is coupled to the +V and −V supplies in a conventional manner and includes a parallel RC feedback network 124 coupled between its output and input terminals. Amplifier 122 can be integrated circuit module type 7741 which is commercially available.

The negative output pulses 112 are applied to the base terminal 126b of amplifying NPN transistor 126 in a level shifting network 125 by means of an input resistor 127. A diode 128 coupled between the base and emitter of transistor 126 clamps the base at approximately $-1V_{be}$ such that the normally conductive transistor 126 will be cut off by the negative applied pulses 112 to provide positive output pulses corresponding in frequency to and directly related to the spped of platen 12. The amplifier and clamp so formed provide noise immunity by use of a feedback capacitor 129 coupled between the collector 126c of transistor 126 and its base. An output capacitor 130 is coupled across the collector to emitter junction and a collector resistor 131 supplies current to the transistor and is coupled to the positive +V supply. A biasing resistor 132 supplies a positive voltage to render transistor 126 conductive unless negative voltage pulses are applied.

Transistor 126 is operated between saturation and cut off such that between the pulses, the output terminal (i.e., the collector terminal) is at near zero potential and when periodically cut off, provides positive pulses. These positive going pulses are applied to a one shot multivibrator circuit 135 which comprises a commercially available integrated circuit module type HL 342 with the terminal numbers shown being the manufacturer's indentification. The RC time constant of the one shot is less than the shortest period between pulses 112 and is fixed by resistor 138 and capacitor 139 coupled as shown. The signals at output terminal 14 of multivibrator 136 are of constant amplitude and width and have a frequency directly related to the motor speed. These signals are positive going signals which are applied to an integration circuit 140 to convert the pulses to an average direct voltage level which increases as the frequency of the output pulses from multivibrator 136 increase.

Integrator 140 includes an operational amplifier 142 which is a commercially available integrated circuit module type 7741 and which has an input filter circuit coupling the output terminal 2 of the one shot multivibrator to the positive input terminal of the amplifier. The filter circuit consists of an RC integrator including resistor 141 and capacitor 144 as well as an input resistor 141 and capacitor 144 as well as an input resistor 143 coupled from the junction of resistor 141 and terminal 2 of the one shot multivibrator to ground. A second series resistor 145 couples the junction of capacitor 144 and resistor 141 to the positive terminal of amplifier 142 which is further coupled to ground by resistor 146. The negative terminal of amplifier 142 is coupled to ground by means of resistor 147. Feedback resistor 148 couples the output terminal of the amplifier to the negative input terminal while the potentiometer 149 having its wiper arm coupled to the $-V$ supply and its opposite ends coupled to the input terminals 1 and 5 corresponding to the manufacturer's terminal numbers is adjusted to provide zero output from the amplifier at zero motor speed.

Output terminal 6 of amplifier 142 provides a positive going direct voltage level whose amplitude varies and increases with increased speed of the polisher motor and platen. The output voltage is employed to drive an rpm calibrated 1 ma meter 150 coupled to the output terminal 6 by means of a fixed resistor 152 and a calibration rheostat 154. Meter 150 includes graduation for indicating directly the rpm of platen 10 during operation. As noted below, speed control potentiometer 160 can be adjusted for the desired speed by the operator while watching this meter. The positive DC output is applied to a summing amplifier circuit 155 for comparing this signal representing the actual detector motor speed with a selectable reference voltage from the speed control potentiometer 160.

The analog operation summing amplifier 155 receives the positive signals from the integrator circuit 140 and includes a 7741 operational amplifier 156 having its positive terminal coupled to chassis ground through a resistor 157. Input resistor 158 applies the speed representative positive direct voltage signals to the negative input terminal of the operational amplifier which receives an offsetting negative voltage selected by the speed control potentiometer 160. Potentiometer 160 is coupled to the minus voltage supply through a rheostat 162 which can be adjusted to provide an upper speed limit and forms part of the voltage divider network from the $-V$ supply to ground which further includes the series coupled resistor 164. Wiper arm 161 of potentiometer 160 is coupled to the negative input of amplifier 156 through resistors 165 and 166. A feedback resistor 167 couples the output terminal 168 of amplifier 156 to the negative input terminal.

A relatively large (2 $\mu$F) capacitor 170 is coupled from the junction of resistors 165 and 166 to ground to provide relatively smooth acceleration during initial turn-on as described in greater detail below. This capacitor is discharged when the speed control is shut off by resistor 172 coupled to chassis ground through relay contacts 282. The output terminal 168 of amplifier 156 is coupled to the motor control circuit 50, shown in FIG. 1, through the output resistor 169 and conductor 89 coupled by interconnecting terminals A in the figures.

It is noted here that in place of tachometer 110, clamp 125 and one shot 135, a direct voltage generator, mechanically coupled to the polisher drive 12, can be employed to directly provide a speed representative direct voltage which can be applied to the summing amplifier 155 preferably through the noise suppressing integrator 140.

The output signals on conductor 89 comprise the motor speed control signals and consist of positively increasing signals which, as the desired motor speed is reached during initial start-up, level off when the selected speed is reached. These signals, applied to the linear amplifier 80, control the current source to trigger the PUT 60 to maintain the desired speed under varying load conditions. Before the motor is energized, the negative voltage from the speed select potentiometer 160 is not offset by a positive signal from the integrator circuit 140. Thus, the inverted output of amplifier 156 is a relatively high positive signal. This voltage actuates the motor control circuit to provide significant drive current to the motor during initial start-up. As the motor speed increases and the output from amplifier integrator 140 increases gradually as capacitor 170 charges, the positive voltage decreases in amplitude until the steady state desired level is reached. Thus, the system comprises a closed loop feedback control with the loop being closed through the optical tachometer.

The speed control circuit includes a negative voltage failure protection circuit 180 consisting of an NPN transistor 182 having base, collector and emitter terminals 182b, 182c and 182e respectively. The base terminal 182b is coupled to a voltage dividing network consisting of resistors 184 and 186 coupled between the +V and −V supplies and having a value such that transistor 182 will normally be nonconductive if both voltage supplies are at their normal levels. A clamping diode 185 is coupled from the base terminal to chassis ground and a current steering diode 187 couples collector terminal 182c to conductor 89. In the event the negative voltage supply fails, the positive voltage from the +V supply will not be offset and the voltage at base terminal 182b will increase to actuate transistor 182 into a saturated mode of conduction thereby effectively grounding conductor 89 preventing speed command signals from being applied to the linear amplifier 80. Thus, the motor will not run away in the event the negative supply is lost. It is noted here that in the event the positive +V or B+ supplies are lost, the control circuits will be inactivated and not develop signals which would cause the motor to increase in speed.

In addition to the speed control circuit previously described, the system includes a speed limit or safety protection circuit which consists of a safety tach circuit 210 identical to circuit 110 and including a second light chopping disc, also coupled to drive 12 as indicated by mechanical interconnection 221 and interconnected terminals B—B in the figures. The safety tach circuit provides negative going signals on output conductor 211 which are applied to a level shift circuit 225 identical to circuit 125. The output of level shift circuit 225 is coupled to the input of a one shot multivibrator 235 identical to circuit 135 and having an output coupled to the input of an integration circuit 240 identical to circuit 140.

The output of integrator 240 is coupled to the input of a summing amplifier 255 which is similar to circuit 155 and includes some of the same components identified by the same first and second most significant reference numerals but preceeded by the numeral 2. The primary difference between summing amplifier 155 and amplifier 255 is the addition of a feedback capacitor 268 to provide a time delay in the output response of the operational amplifier 256 therein such that the motor inactivating contacts 19 of relay 200 will not be opened until a failure has occurred and the motor speed exceeds the limit for at least one-half second or more. The value of capacitor 268 and resistor 267 can be selected for a greater or lesser time delay as desired.

The summing amplifier receives a reference direct voltage from the speed limit potentiometer 260 which has its wiper arm 261 coupled to the negative input to amplifier 256 by resistors 266 and 272. Potentiometers 160 and 260 comprise a gauged potentiometer with the wiper arms commonly coupled as indicated by dotted lines 265. The padding resistor 264 has a valve slightly greater than resistor 164 such that the negative speed limit reference signal from resistor 260 represents a speed approximately 10% greater than the speed selected by potentiometer 160 and tracks with changes in the selected speed. In the event the actual speed signals from integrator 255 reach a level equal to or exceeding the speed limit reference signal, the output of amplifier 256 will drop toward ground. The output of summing amplifier 255 is coupled to a relay control circuit 275 by means of a current steering diode 276 coupled from the amplifier 256 to an amplifier comprising NPN transistors 278 and 279 coupled in a Darlington configuration as shown in the figure.

In the collector circuits of transistors 278 and 279 there is provided a control relay 280 including a relay coil 281 and relay contact switches 282 and 284. An antichatter diode 283 is coupled in shunt with relay coil 281. The terminal of coil 281 remote from the junction of this coil with transistors 278 and 279, is coupled to a single pole single throw push button momentary start switch 206 having its remaining terminal coupled to B+ through a normally closed push button stop switch 205.

Thus, when start switch 206 is momentarily actuated and NPN transistors 278 and 279 have a positive signal applied from summing amplifier 255 and are conductive, the actuation of switch 206 will actuate coil 281 and close switch contacts 284 to latch relay 281 such that when the start push button switch 206 is released, contacts 284 remain closed and normally closed contacts 282, which serve to discharge capacitor 170, open allowing capacitor 170 to charge during acceleration of the motor 14. Upon actuation of relay 281, the B+ voltage is also applied to relay 200 through closed contacts 284 to actuate relay 200 and close safety overload switch 19 (FIG. 1). Relay 200 includes a relay coil 201 and an antichatter diode 202 with the coil being coupled from contacts 284 to chassis ground as shown in FIG. 2. It is noted here that in place of two tachometers 110 and 210, conductor 211 could be coupled to conductor 111 and employ output signals 112 for driving the speed limit circuit. Also, a single DC generator could be employed in place of the pair of tachometers. In such case, however, the additional production provided by the dual inputs shown in FIG. 2 would not be realized.

An alternative embodiment of the circuitry shown in FIGS. 1 and 2 is shown in block form in FIG. 3 where a single D.C. tachometer 290 is employed. In this embodiment, tachometer 290 is a commercially available unit Model No. CMO-9608001 made by the Singer Company and provides approximately 3 volts D.C. output at 1000 rpm's. The tachometer is mechanically coupled to drive motor 14 as schematically shown by dashed line 294. The electrical output is coupled to the junction of resistors 141 and 145 of the motor control circuit, as shown in FIG. 2, by means of conductor 292. The motor control circuit 295 comprises the same circuit shown in FIG. 2 but including only circuits 50, 140, 155 and 255 with the associated control relays and switches.

In the FIG. 3 embodiment, the motor 14 speed is limited by the upper speed limiting resistor 162 and the speed indicator meter 150 is coupled to the motor control circuit 295 in a manner similar to that shown in FIG. 2. With the system shown in FIG. 3, therefore, the improved line synchronization of triggering triac 20 is provided as is the speed indicator but the safety speed limit control channel is eliminated with the maximum speed level limit being provided by the speed limiting potentiometer 162. This embodiment is useful in many applications where samples are not of extraordinary value or significant speed excesses will not destroy or seriously injure the specimen being polished.

Having described the interconnected structure comprising the control, speed limit and safety circuits for the polisher, a description of the operation of the control circuit is now presented.

OPERATION

In operation, first the power on-off switch 28 is closed thereby applying power to the power supply 36 and the remaining circuit elements actuated by the voltages supplied by the power supply. To initiate operation of the polisher, the momentarily actuated push button start switch 206 is depressed which, as noted above, actuates relay 280 to latch this relay on in turn activating relay 200 to close switch 19 shown in FIG. 1. Actuation of this switch applies alternating current from source 17 to rectifier 25 for applying a positive pulsating voltage to the SCR 20 in series with the current path for motor 14.

During start up, there will be no pulses from either tachometers 110 or 210, therefore, the inputs to the summing amplifiers 155 and 255 will comprise the negative DC level selected by the previously selected potentiometers 161 and 261. With the relatively large negative voltage applied to amplifiers 156 and 256, the output voltages will be at a relatively high positive level. For the safety circuit this will maintain relay 281 actuated as noted above and for the speed control circuit, the positive voltage present on line 89 is applied to the base to the input of linear amplifier including transistor 80 to render current source transistor conductive for charging capacitor 72 relatively rapidly. Thus, the voltage across capacitor 72 will reach the firing potential for the PUT 60 and apply a positive signal to the gate of SCR 20 triggering the SCR for completing the current path for motor 14. Due to the relatively high positive voltage applied on conductor 89, the actuation of the PUT will occur early in one of the half cycles of waveform 37' during each half cycle of power supply operation. Thus, the on time of the duty cycle of SCR 20 will be substantial to cause acceleration of motor 14. As described above, capacitor 170 provides relatively smooth acceleration at the initial actuation of the polisher.

As the motor speed increases, the negative output pulses from the tachometers increase in frequency such that the offsetting positive direct voltage developed at the output of integrators 140 and 240 and summed with the predetermined negative speed select and limit voltages tend to stabilize the positive DC level on conductor 89 at the desired selected speed and maintain amplifier 256 output positive. The line synchronization circuit including transistors 90 and 92 periodically discharge capacitor 72, as noted above, such that the pulsed DC voltage applied to the SCR 20 from circuit 25 will be in phase with the periodic actuation of PUT 60. When equilibrium is reached as the motor reaches the preselected speed, the negative voltage on potentiometer arm 261, however, maintains relay switch 19 closed to noted above. The specimen or specimens to be polished are inserted on the platen 10 and as the initial loading tends to decrease the platen speed, the resultant reduced frequency of pulses 112 from tachometer 110 results in a lower positive offsetting voltage applied to the negative input terminal of summing amplifier 156 and, therefore, an increased positive output voltage tending to turn the SCR on during a greater portion of each half cycle of power supply frequency until equilibrium is again reached and the turntable speed has stabilized at the desired preselected speed.

In the event of failure of the speed control or other circuitry such that the speed tends to increase beyond the predetermined limit, the positive speed representative direct voltage signals from integrator 240 will exceed the negative speed limit signal from resistor 260 thereby causing the output of amplifier 257 to approach zero cutting off the Darlington amplifier of the relay driver circuit 275 inactivating relay 281 and consequently relay 200. When relay 200 is inactivated, switch 19 opens thereby cutting off the motor and protecting the specimens being polished.

In the event that the positive supply voltage fails, the system will automatically turn off due to a lack of operating voltage to the various circuit elements. If only the negative supply voltage fails, the negative protection circuit 180 is actuated to pull conductor 89 to ground potential thereby inactivating the speed command signals on conductor 30 and assuring SCR 20 remains nonconductive.

Once the specimen has been polished for a desired time period, the stop switch 205 is momentarily actuated to unlatch relay 280 and accordingly, shut off the system by removing B+ from the relay driver unit and inactivating relay 200. If, once the specimen has been examined and additional polishing is desired, the sample can be repolished at the same speed by pressing the start button upon which the polisher will again return to the preprogrammed and selected speed.

Thus, by virtue of the speed control, the speed limit control and the motor control circuits, the polishing apparatus of the present invention provides a constant speed control system under varying load conditions and one which prevents excessive speeds from damaging the specimen due to component failure of the system including power supply failure. It will become apparent to those skilled in the art that various modifications to the present invention can be made without departing from the spirit or scope of the invention as defined by the appended claims.

The embodiments of the invention in which an exclusive property or privilege is claimed and defined as follows:

1. In apparatus for abrading metallographic specimens, a drive system for a movable abrasive element comprising:
   electrical drive means coupled to said abrasive element for actuating of said element;
   means for developing signals representative of the speed of operation of the abrasive element;
   a speed control circuit coupled to said developing means for providing selectable speed control signals;
   a drive control circuit coupled to said speed control circuit and to said drive means and responsive to signals from said speed control circuit to actuate and maintain said drive means at a selectable speed; and
   a speed limit control circuit coupled to said developing means and to said drive control circuit to deactuate said drive means only in the event the speed of said abrasive element exceeds a preselected speed by more than a predetermined amount.

2. The system as defined in claim 1, wherein said drive control circuit includes a triggerable switch for selectively coupling said drive means to a source of operating power and noise immune circuit means for developing a control signal applied to a control element of said triggerable switch for actuation of said switch.

3. The system as defined in claim 2 wherein said speed control circuit includes means for providing a reference signal representative of a desired speed of operation and a summing amplifier coupled to said providing means and to said developing means for providing said selectable speed control signals applied to said drive control circuit.

4. The system as defined in claim 3 wherein said noise immune circuit means includes charge storage means, a controllable direct current constant current source coupled to said charge storage means, a linear amplifier coupled to said current source and to said speed control circuit for controlling the charging current of said charge storage means, and discharge means coupled to said charge storage means for discharging said charge storage means when a predetermined charge is reached and for developing said control signal applied to said control element of said triggerable switch.

5. The system as defined in claim 4, wherein said discharge means comprises a PUT coupled in parallel with said charge storage means and including a resistor in series therewith for developing said control signal in response to current through said PUT.

6. A control system for a metallographic polisher including a polishing member comprising:
 a drive motor having an output shaft coupled to said polishing member;
 means for supplying operating power to said drive motor and including a selectively actuatable current controlling switch and a safety switch;
 a motor control circuit coupled to said current control switch and to said safety switch;
 a tachometer circuit coupled to said motor for developing signals representative of the speed of said polishing member;
 a speed control circuit coupled to said tachometer circuit and to said motor control circuit to develop speed control signals applied to said motor control circuit and selectable to maintain said polishing member at a selected speed; and
 a speed limit circuit coupled to said tachometer circuit and to said motor control circuit to apply signals to said motor control circuit for actuating said safety switch for deactuating said drive motor only in the event the selected speed is exceeded by a predetermined amount.

7. The system as defined in claim 6 wherein said speed limit circuit includes delay means for delaying operation of said safety switch for a relatively short time where the excess speed variation of said polisher member is of relatively short duration.

8. For use in an apparatus for abrading a metallographic specimen, a drive system for selecting and maintaining a constant speed of operation comprising:
 a drive motor coupled to an abrasive element for actuation of said element;
 means for providing a selected control signal representative of the desired speed of operation of said drive motor;
 means for developing a signal representative of the actual speed of operation of said abrading element;
 indicating means coupled to said developing means for displaying the speed of operation of said abrading element;
 motor control circuit means coupled to said providing and developing means for correlating the selected speed signal with the actual speed signal and to said drive motor for supplying current to said drive motor to maintain the selected speed of said drive motor under varying load conditions;
 and speed limit means coupled to said motor control circuit means for limiting the speed of said drive motor to a predetermined level only in the event of failure of said developing means.

9. The system as defined in claim 8 wherein said indicating means comprises a meter calibrated in revolutions per minute and responsive to signals from said developing means to display the speed of operation of said abrading element.

* * * * *

UNITED STATES PATENT AND TRADEMARK OFFICE
CERTIFICATE OF CORRECTION

PATENT NO. : 3,935,677

DATED : February 3, 1976

INVENTOR(S) : Gerald G. Swiatlowski

It is certified that error appears in the above-identified patent and that said Letters Patent are hereby corrected as shown below:

Column 1, line 13:
"andd" should be ---and---.
Column 1, line 52:
After "for" insert ---a---.
Column 3, line 27:
"a" (first occurrence) should be ---an---.
Column 3, line 38:
"20" should be ---SCR---.
Column 3, line 47:
"of" should be ---at---.
Column 4, line 22:
After "Since" insert ---the---.
Column 4, line 67:
After "be" insert ---an---.
Column 5, line 9:
"spped" should be ---speed---.
Column 5, line 44:
After "144" delete ---as well as an input resistor 141 and capacitor 144---.
Column 6, line 7:
"operation" should be ---operating---.
Column 8, line 27
"production" should be ---protection---.
Column 9, line 48
"to" (first occurrence) should be ---as---.
Column 10, line 32
"and" should be ---are---.

Signed and Sealed this fifteenth Day of June 1976

[SEAL]

Attest:

RUTH C. MASON
Attesting Officer

C. MARSHALL DANN
Commissioner of Patents and Trademarks